United States Patent
Robinson

(10) Patent No.: US 8,058,336 B2
(45) Date of Patent: Nov. 15, 2011

(54) FLAME RETARDANT POLYMER COMPOSITION COMPRISING POLYOLEFIN WITH HIGH MOLECULAR WEIGHT DISTRIBUTION

(75) Inventor: James Elliott Robinson, Genval (BE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/301,807

(22) PCT Filed: May 16, 2007

(86) PCT No.: PCT/EP2007/004395
§ 371 (c)(1),
(2), (4) Date: Jun. 24, 2010

(87) PCT Pub. No.: WO2007/137710
PCT Pub. Date: Dec. 6, 2007

(65) Prior Publication Data
US 2010/0273926 A1 Oct. 28, 2010

(30) Foreign Application Priority Data
May 31, 2006 (EP) .................................... 06011267

(51) Int. Cl.
*C08K 13/02* (2006.01)
*C08K 9/06* (2006.01)
*C08K 7/10* (2006.01)
*C08K 7/18* (2006.01)
*G03C 1/00* (2006.01)

(52) U.S. Cl. ........ 524/425; 524/427; 524/261; 524/449; 524/451; 524/452; 252/609

(58) Field of Classification Search ................. 524/261, 524/427, 425, 449, 452; 252/609
See application file for complete search history.

(56) References Cited

U.S. PATENT DOCUMENTS

| | | | |
|---|---|---|---|
| 3,300,459 A | 1/1967 | Natta et al. | |
| 5,919,877 A | 7/1999 | Tanaglia | |
| 2005/0119380 A1* | 6/2005 | Iwashita | 524/183 |
| 2007/0112111 A1* | 5/2007 | Jungkvist et al. | 524/261 |

FOREIGN PATENT DOCUMENTS

| | | | |
|---|---|---|---|
| EP | 0 060 090 | | 9/1982 |
| EP | 0 393 959 | | 10/1990 |
| EP | 1316581 | * | 6/2003 |
| WO | 98 12253 | | 3/1998 |
| WO | 98 24842 | | 6/1998 |
| WO | WO 2006/089735 | * | 8/2006 |

* cited by examiner

*Primary Examiner* — James J Seidleck
*Assistant Examiner* — Deve E Valdez
(74) *Attorney, Agent, or Firm* — Roberts Mlotkowski Safran & Cole, P.C.

(57) ABSTRACT

The present invention relates to a flame retardant polymer composition, comprising (A) a polyolefin comprising a polyolefin with a molecular weight distribution $M_w/M_n > 20$, (B) a silicone-group containing compound, and (C) an inorganic filler material, to an article, in particular a wire or cable, comprising said flame retardant polymer composition, and to the use of said composition for the production of a layer of a wire or cable.

21 Claims, No Drawings

FLAME RETARDANT POLYMER COMPOSITION COMPRISING POLYOLEFIN WITH HIGH MOLECULAR WEIGHT DISTRIBUTION

The present invention relates to a flame retardant polymer composition, to an article, in particular a wire or cable, comprising said flame retardant polymer composition, and to the use of said composition for the production of a layer of a wire or cable.

For improving the flame retardancy of polymers, several approaches are known in the art. First, it is known to include compounds containing halides into the polymer. However, these materials have the disadvantage that upon burning hazardous and corrosives gases like hydrogen halides are deliberated. This is also a disadvantage of flame retardant polymer composition based on PVC.

In a further approach, flame retardant compositions include relatively large amounts, typically 50 to 60 wt. %, of inorganic fillers such as e.g. hydrated and hydroxy compounds, which during burning decompose endo-thermically and deliberate inert gases at temperatures in the range of 200 to 600° C. Such inorganic fillers e.g. include $Al(OH)_3$ and $Mg(OH)_2$. However, these flame retardant materials suffer from the high costs of the inorganic fillers and the deterioration of the processability and mechanical properties of the polymer composition due to the high amount of filler.

A third approach as disclosed in EP 0 393 959 uses a silicon fluid or gum in a composition together with an organic polymer comprising an ethylene acrylate or acetate copolymer, and an inorganic filler. Although such a composition has good flame retardant properties, the processability of the composition may still be improved because often melt fracture occurs when the composition is extruded as a cable layer. Furthermore, the surface quality of extruded cable layers often is insufficient and may also be further improved.

It is thus an object of the present invention to avoid the disadvantages of the prior art materials and to provide a flame retardant polymer composition which shows a combination of good flame retardancy, good processability, such as extrudability, and good mechanical properties, such as improved surface quality.

The present invention is based on the finding that the processability and surface quality of a polymer composition comprising an organic polymer, a silicone group containing compound and an inorganic filler material can be improved if it comprises a polyolefin, i.e. an olefin homo- or copolymer, with a high molecular weight distribution, usually above 20.

The invention therefore provides a flame retardant polymer composition which comprises
(A) a polyolefin comprising a polyolefin with a molecular weight distribution $M_w/M_n > 20$,
(B) a silicone-group containing compound, and
(C) an inorganic filler material.

The composition of the invention shows improved processability as can be seen by an improved extrusion behaviour when the composition is extruded as a layer of a wire or cable. Furthermore, the extruded layers have good/improved surface quality.

Preferably, the composition is free of halogen- and phosphorous-containing compounds as flame retardancy aids, i.e. such compounds, if at all, are present in the composition in an amount of below 3000 ppm.

More preferably, the composition is entirely free of halogen-containing compounds. However, especially phosphorous containing-compounds may be present in the composition as stabilizers, usually in an amount of below 2000 ppm, more preferably below 1000 ppm.

In the composition, components (A) to (C), and optional component (D) as described below, may either consist of a single chemical compound or a mixture of compounds of the required type.

Furthermore, wherever herein the term "polyolefin" (or "polyethylene") is used both olefin homo- or copolymers (or ethylene homo- or copolymers) are meant.

In the composition of the invention, preferably the amount of component (A) is from 30 to 70 wt. % of the total polymer composition, more preferably is from 40 to 60 wt % of the total composition.

Component (A) preferably comprises, more preferably consists of, a polyolefin with a molecular weight distribution $M_w/M_n$ of >20, more preferably of >22, and most preferably of >25.

Preferably, polyolefin (A) with the high molecular weight distribution is produced in a high pressure process, i.e. typically under a pressure of 50 MPa and above, without the use of a coordination catalyst.

Further preferred, an autoclave reactor is used for the production of said polyolefin (A).

Still further, component (A) preferably comprises, more preferably consists of, a polyolefin which has a g' value of 0.35 or less.

Preferably, component (A) comprises, more preferably consists of, a polyolefin with a shear thinning index (SHI) $eta_{0.05}/eta_{300}$ of at least 70.

Component (A) is formed by a polyolefin, i.e. by an olefin, preferably ethylene, homo- and/or copolymer. Such polyolefins include, for example, homopolymers or copolymers of ethylene, propylene and butene and polymers of butadiene or isoprene. Suitable homopolymers and copolymers of ethylene include low density polyethylene, linear low, medium or high density polyethylene and very low density polyethylene. Suitable ethylene copolymers include such with of $C_3$- to $C_{20}$-alpha-olefins, $C_1$- to $C_6$-alkyl acrylates, $C_1$- to $C_6$-alkyl methacrylates, acrylic acids, methacrylic acids and vinyl acetates. Preferred examples for the alkyl alpha-olefins are propylene, 1-butene, 4-methyl-1-pentene, 1-hexene and 1-octene.

In the composition of the invention, component (A) preferably comprises, more preferably consists of, a polyolefin with polar groups.

The polyolefin, more preferably polyethylene, with polar copolymer preferably is produced by copolymerisation of olefin monomers with polar comonomers. However, it may also be produced by grafting a polyolefin, for example by grafing acrylic acid, methacrylic acid or maleic anhydride onto the polyolefin.

It is preferred that the polar groups are introduced into the polyolefin by copolymerisation of olefin monomers with appropriate comonomers bearing polar groups.

It is further preferred that the polar copolymer comprises a copolymer of an olefin, preferably ethylene, with one or more comonomers selected from $C_1$- to $C_6$-alkyl acrylates, $C_1$- to $C_6$-alkyl methacrylates, acrylic acids, methacrylic acids and vinyl acetate. The copolymer may also contain ionomeric structures (like in e.g. DuPont's Surlyn types).

Still further preferred, the polar copolymer is an olefin/acrylate, and/or olefin/acetate, copolymer, more preferably ethylene/acrylate, and/or ethylene/acetate.

Further preferred, the polar polymer comprises a copolymer of an olefin, preferably ethylene, with $C_1$- to $C_4$-alkyl, such as methyl, ethyl, propyl or butyl, acrylates or vinylacetate.

In a particularly preferred embodiment, component (A) of the polymer composition used for the flame retardant layer comprises, preferably comprises at least 25 wt %, more preferably at least 35 wt % and most preferably consists of, a copolymer or a mixture of copolymers of an olefin, preferably ethylene, with one or more comonomers selected from the group of non-substituted or substituted acrylic acids according to formula (I):

$$H_2C=CR-COOH \quad (I)$$

wherein R is H or an organic substituent, preferably R is H or a hydrocarbon substituent.

More preferably, the type of comonomer is selected from the group of acrylic acid according to formula (I) wherein R is H or an alkyl group, still more preferably R is H or a $C_1$- to $C_6$-alkyl substituent.

It is particularly preferred that the polar polyolefin comprises a copolymer of ethylene with an acrylic copolymer, such as ethylene acrylic acid or methacrylic acid copolymer, and most preferred is ethylene methacrylic acid copolymer.

Preferably, the amount of comonomer with polar groups in the olefin copolymer is from 2 to 40 wt. %, more preferably is from 4 to 20 wt. % and most preferably is from 6 to 12 wt. %.

In addition to olefin and the other, above-defined comonomers, the copolymers may also contain further monomers. For example, terpolymers between acrylates and acrylic acid or methacrylic acid, or acrylates with vinyl silanes, or acrylates with siloxane, or acrylic acid with siloxane may be used.

These copolymers may be crosslinked after extrusion, e.g. by irradiation. Silane-crosslinkable polymers may also be used, i.e. polymers prepared using unsaturated silane monomers having hydrolysable groups capable of crosslinking by hydrolysis and condensation to form silanol groups in the presence of water and, optionally, a silanol condensation catalyst.

It is further preferred that the polyolefin with polar groups makes up at least 30 wt. %, more preferred at least 50 wt. %, and still more preferred at least 70 wt. % of component (A). Most preferably, component (A) completely consists of the polyolefin with polar groups.

The composition further comprises a silicone-group containing compound (B).

In a preferred embodiment of the inventive composition, component (B) is a silicone fluid or a gum, or an olefin, preferably ethylene, copolymer comprising at least one silicone-group containing comonomer, or a mixture of any of these compounds.

Preferably, said comonomer is a vinylpolysiloxane, as e.g. a vinyl unsaturated polybishydrocarbylsiloxane.

Silicone fluids and gums suitable for use in the present inventions are known and include for example organopolysiloxane polymers comprising chemically combined siloxy units selected from the group consisting of $R_3SiO_{0.5}$, $R_2SiO$, $R^1SiO_{1.5}$, $R^1R_2SiO_{0.5}$, $RR^1SiO$, $R^1_2SiO$, $RSiO_{1.5}$ and $SiO_2$ units and mixtures thereof in which each R represents independently a saturated or unsaturated monovalent hydrocarbon radical and each $R^1$ represents a radical such as R or a radical selected from the group consisting of hydrogen, hydroxyl, alkoxy, aryl, vinyl or allyl radicals.

The organopolysiloxane preferably has a number average molecular weight $M_n$ of approximately 10 to 10,000,000. The molecular weight distribution (MWD) measurements were performed using GPC. $CHCl_3$ was used as a solvent. Shodex-Mikrostyragel ($10^5$, $10^4$, $10^3$, 100 Å) column set, RI-detector and a NMWD polystyrene calibration were used. The GPC tests were performed at room temperature.

The silicone fluid or gum can contain fumed silica fillers of the type commonly used to stiffen silicone rubbers, e.g. up to 50% by weight.

Copolymers of an olefin, preferably ethylene, and at least one silicone-group containing comonomer preferably are a vinyl unsaturated polybis-hydrocarbylsiloxane or an acrylate or methacrylate modified hydrocarbyl siloxane according to formula (II) and (III):

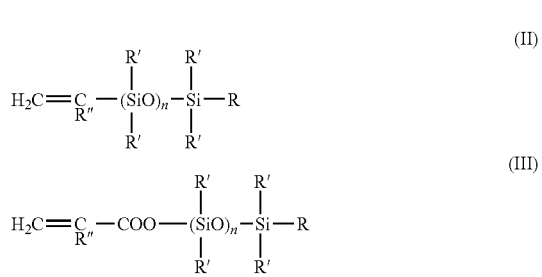

wherein in both (II) and (III) n=1 to 1000 and
R and R' independently are vinyl, alkyl branched or unbranched, with 1 to 10 carbon atoms; aryl with 6 or 10 carbon atoms; alkyl aryl with 7 to 10 carbon atoms; or aryl alkyl with 7 to 10 carbon atoms. R" is hydrogen or an alkyl chain.

Such compounds e.g. are disclosed in WO 98/12253 the contents of which is herein enclosed by reference.

Preferably, component (B) is polydimethylsiloxane, preferably having a $M_n$ of approximately 1,000 to 1,000,000, more preferably of 200,000 to 400,000, and/or a copolymer of ethylene and vinyl polydimethylsiloxane. These components (B) are preferred due to commercial availability.

The term "copolymer" as used herein is meant to include copolymers produced by copolymerization or by grafting of monomers onto a polymer backbone.

It is preferred that silicone-group containing compound (B) is present in the composition in an amount of 0.5 to 40 wt. %, more preferred 0.5 to 20 wt. %, still more preferred from 0.5 to 10 wt. % and most preferred 1 to 5 wt. % of the total composition.

It is, furthermore, preferred that the silicone-group containing compound is added in such an amount that the amount of silicone-groups in the total composition is from 1 to 20 wt. %, more preferably from 1 to 10 wt %.

It is preferred that inorganic filler (C) is present in the composition in an amount of more than 10 wt %, more preferred of 20 wt % or more, still more preferred of 30 wt % or more, and most preferred of 35 wt % or more.

It is further preferred that inorganic filler (C) is present in the composition in an amount up to 70 wt %, more preferably of up to 60 wt % and most preferably of up to 55 wt %.

to Component (C), i.e. the inorganic filler material suitable for use in the composition, comprises all filler materials as known in the art. Component (C) may also comprise a mixture of any such filler materials. Examples for such filler materials are oxides, hydroxides and carbonates of aluminium, magnesium, calcium and/or barium.

Preferably, component (C) comprises an inorganic compound of a metal of groups 1 to 13, more preferred groups 1 to 3, still more preferred groups 1 and 2 and most preferred group 2, of the Periodic Table of Elements.

The numbering of chemical groups, as used herein, is in accordance with the IUPAC system in which the groups of the periodic system of the elements are numbered from 1 to 18.

Preferably, inorganic filler component (C) comprises, more preferably consists of, a compound which is neither a hydroxide, nor a hydrated compound, still more preferably comprises, more preferably consists of, a compound selected from carbonates, oxides and sulphates, and most preferably comprises, more preferably consists of, a carbonate.

Preferred examples of such compounds are calcium carbonate, magnesium oxide and huntite $Mg_3Ca(CO_3)_4$, with a particular preferred example being calcium carbonate.

Although inorganic filler (C) preferably is not a hydroxide or hydrated compound, it may contain small amounts of hydroxide typically less than 5% by weight of the filler, preferably less than 3% by weight. For example there may be small amounts of magnesium hydroxide in magnesium oxide. Furthermore, although filler (C) is not a hydrated compound, it may contain small amounts of water, usually less than 3% by weight of the filler, to preferably less than 1% by weight. However, it is most preferred that component (C) is completely free of hydroxide and/or water.

Preferably, component (C) of the inventive flame retardant polymer composition comprises 50 wt % or more of calcium carbonate and further preferred consists of calcium carbonate.

The inorganic filler may comprise a filler which has been surface-treated with an organosilane, a polymer, a carboxylic acid or salt etc. to aid processing and provide better dispersion of the filler in the organic polymer. Such coatings usually do not make up more than 3 wt. % of the filler.

Preferably, the compositions according to the present invention contain less than 3 wt. % of organo-metallic salt or polymer coatings.

Furthermore, also other mineral fillers such as glass fibres may be part of the composition.

In a preferred embodiment of the composition of the invention, the composition further comprises (D) a polypropylene in an amount of 0.1 to 10 wt. % with respect to the total composition.

Preferably, the amount of polypropylene (D) is 0.2 wt. % or more, more preferably is 0.3 wt. % or more, and most preferably is 0.5 wt. % or more of the total composition.

Furthermore, preferably the amount of polypropylene (D) is 8 wt. % or less, more preferably is 4 wt. % or less, and most preferably is 3 wt. % or less of the total composition.

Still further, preferably polypropylene (D) has a $MFR_2$ measured according to ISO 1133 at 230° C. and 2.16 kg of 0.1 to 15 g/10 min, more preferably of 0.5 to 10 g/10 min.

Polypropylene (D) preferably has a tensile modulus measured according to ISO 527-2 of 800 to 2000 MPa, more preferably of 900 to 1600 MPa.

In a preferred embodiment, polypropylene (D) is a propylene heterophasic copolymer comprising a polypropylene homo- or copolymer as matrix polymer and an incorporated ethylene-propylene-rubber.

The heterophasic propylene copolymer may be produced by multistage process polymerisation of propylene and ethylene and optionally alpha-olefin such as bulk polymerisation, gas phase polymerisation, slurry polymerisation, solution polymerisation or combinations thereof using conventional catalysts. The heterophasic copolymer can be made either in loop reactors or in a combination of loop and gas phase reactor. Those processes are well known to one skilled in the art.

A preferred process is a combination of a bulk slurry loop reactor(s) and gas phase reactor(s). First, the propylene homo- or copolymer matrix is made either in loop reactor(s) or in a combination of loop and gas phase reactor.

The polymer produced in this way is transferred into another reactor and the disperse phase, the ethylene-propylene-rubber, is produced by copolymerising a mixture of ethylene and propylene with the same catalyst system, so obtaining a heterophasic system consisting of a semicrystalline matrix with a nearly amorphous elastomeric component dispersed within it. Preferably this polymerisation step is done in a gas phase polymerisation.

A suitable catalyst for the polymerisation of the heterophasic copolymer is any stereospecific catalyst for propylene polymerisation which is capable of polymerising and copolymerising propylene and comonomers at a temperature of 40 to 110° C. and at a pressure from 10 to 100 bar. Ziegler-Natta catalysts as well as metallocene catalysts are suitable catalysts.

Alternatively to producing the heterophasic copolymer in a sequential multistage process as described above, it can be produced by polymerising the matrix polymer and the ethylene-propylene-rubber in separate steps and melt blending the two polymers.

"Rubber" and "elastomeric copolymer" are in this context used as synonyms.

An ethylene propylene elastomeric copolymer may be produced by known polymerisation processes such as solution, suspension and gas-phase polymerisation using conventional catalysts. Ziegler-Natta catalysts as well as metallocene catalysts are suitable catalysts.

A widely used process is the solution polymerisation. Ethylene, propylene and catalyst systems are polymerised in an excess of hydrocarbon solvent. Stabilisers and oils, if used, are added directly after polymerisation. The solvent and unreacted monomers are then flashed off with hot water or steam, or with mechanical devolatilisation. The polymer, which is in crumb form, is dried with dewatering in screens, mechanical presses or drying ovens. The crumb is formed into wrapped bales or extruded into pellets.

The suspension polymerisation process is a modification of bulk polymerisation. The monomers and catalyst system are injected into the reactor filled with propylene. The polymerisation takes place immediately, forming crumbs of polymer that are not soluble in the propylene. Flashing off the propylene and comonomer completes the polymerisation process.

The gas-phase polymerisation technology consists of one or more vertical fluidised beds. Monomers and nitrogen in gas form along with catalyst are fed to the reactor and solid product is removed periodically. Heat of reaction is removed through the use of the circulating gas that also serves to fluidise the polymer bed. Solvents are not used, thereby eliminating the need for solvent stripping, washing and drying.

The production of ethylene propylene elastomeric copolymers is also described in detail in e.g. U.S. Pat. No. 3,300,459, U.S. Pat. No. 5,919,877, EP 0 060 090 A1 and in a company publication by EniChem "DUTRAL, Ethylene-Propylene Elastomers", pages 1-4 (1991).

Alternatively, elastomeric ethylene-propylene copolymers, which are commercially available and which fulfill the indicated requirements, can be used.

The heterophasic copolymer is then produced by combining the matrix polymer in the form of powder or granules and the elastomeric copolymer in a melt mixing device.

In case a polypropylene random copolymer is used as matrix polymer for the heterophasic copolymer, the comonomers preferably are linear alpha-olefins or branched alpha-olefins like ethylene, butene, hexene etc. In the present invention ethylene is most preferred.

The comonomer content is preferably equal to or below 10 wt.-%, more preferably between 4 and 8 wt %, based on the total polypropylene random copolymer.

However, preferably the matrix polymer is a polypropylene homopolymer.

Furthermore, the heterophasic copolymer contains an ethylene-propylene-rubber preferably in a content of equal to or below 35 wt %, more preferably from 10 to 20 wt %, based on the total weight of polymer (D).

The ethylene-propylene-rubber preferably has a propylene content of 40 to 80 wt. %, more preferably of from 45 to 60 wt. %, based on the total amount of the ethylene-propylene-rubber.

The ethylene-propylene rubber apart from ethylene and propylene monomer units may contain further alpha-olefin monomer units. However, it is preferred that the ethylene-propylene rubber consists of ethylene and propylene monomer units.

The composition according to the present invention may be cross-linkable. It is well known to cross-link thermoplastic polymer compositions using irradiation or cross-linking agents such as organic peroxides and thus the compositions according to the present invention may contain a cross-linking agent in a conventional amount. Silane cross-linkable polymers may contain a silanol condensation catalyst.

In addition to components (A) to (D) the composition of the invention may also contain additional conventional polymer ingredients such as, for example, antioxidants or UV stabilizers in small amounts, usually below 10 wt. %, more preferably below 5 wt. %.

The flame retardant polymer composition of the invention may be prepared by
a) preparation of a master batch comprising the silicone-group containing compound, additives and polymer followed by compounding with inorganic filler and matrix polymer or
b) one step compounding of all components.

For mixing, a conventional compounding or blending apparatus, e.g. a Banbury mixer, a 2-roll rubber mill, Buss-co-kneader or a twin screw extruder may be used.

Preferably, the composition will be prepared by blending them together at a temperature which is sufficiently high to soften and plasticise the polymer, typically a temperature in the range of 120 to 200° C.

The flame retardant compositions of the invention can be used in many and diverse applications and products. The compositions can for example be moulded, extruded or otherwise formed into mouldings, sheets and fibers.

The present invention thus further relates to an article comprising the flame retardant polymer composition in any of the above-described embodiments.

In particular, the invention relates to a wire or cable comprising a layer made of the flame retardant composition in any of the above-described embodiments and, accordingly, to the use of a flame retardant polymer composition in any of the above-described embodiments for the production of a layer of a wire or cable.

The polymer composition preferably is extruded to form a flame retardant layer of a wire or cable. This is preferably done at a line speed of at least 20 m/min, more preferably at least 60 m/min and most preferably at least 100 m/min.

The pressure used for extrusion preferably is 50 to 500 bar.

In the following the present invention is further illustrated by means of examples.

EXAMPLES

1. Measurement Methods a) Confocal Laser Scanning Microscopy

The improved surface smoothness and reduced melt fracture has been evaluated by confocal laser scanning microscopy using a Leica TCS-SP. The investigation area was 500× 500 micrometer, and the wavelength of the laser-beam was 488 nm. As the lens, a HC PL APO 20×/0.70 was used, and the resolution in xy-direction was 279 nm, and in xz-direction 768 nm. The step size in the tests was 486 nm.

The resolution of the z-Table was 40 nm, the z-standard (for function control and validation) was from Rommelwerke with $R_{max}$ of 0.97 micron.

b) Melt Flow Rate

The melt flow rate $MFR_2$ was measured in accordance with ISO 1133 at 190° C. and a load of 2.16 kg for polyethylene and at 230° C. and a load of 2.16 kg for polypropylene.

c) Tensile Modulus

Tensile modulus was determined according to ISO527-2.

d) Molecular Weight Distribution and Long Chain Branching

The following procedure is used to determine g'. This procedure should be followed when determining the branching parameter g' in accordance with the present invention.

Gel Permeation Chromatography is used for determination of molecular weight (M), molecular weight distribution ($M_w/M_n$), intrinsic viscosity [η] and contents of long chain branching (LCB) g'.

Gel Permeation Chromatography (GPC), which is also known as Size Exclusion Chromatography (SEC), is an analytical technique where the molecules are separated after their size. Large molecules elutes first and the smaller ones later.

Molecules elute after decreasing hydrodynamic volume $V_h$. This can be described as a product of the molecules molecular weight (M) and its intrinsic viscosity [η].

The principal of universal calibration in GPC states that for given sets of solvent and temperature conditions in which a polymer sample is separated by pure size mechanism (no adsorption or other effects), the logarithm of the hydrodynamic volume of a polymer molecule as a function of its elution volume (or time) is identical for all polymers, linear or branched. See the equation:

$$V_h=[\eta] \times M \text{ or } \log V_h=\log([\eta] \times M)$$

The hydrodynamic volume is defined as a product of intrinsic viscosity [η] and molecular weight M.

Universal calibration is independent of the polymer type and possible branched polymers.

A serial of small standard is used to find the relation between retention time and molecular weight.

Mark-Houwink-Sakurade equation relates a polymer intrinsic viscosity to its viscosity average molecular weight $M_v$.

$$[\eta]=K \times M_v^a$$

[η] is the intrinsic viscosity.
$M_v$ is the viscosity average molecular weight.
K and a are Mark-Houwink constants. These constants are dependent of the polymer type, solution and the temperature.

By taking the logarithm on both sides of the equation we will get:

$$\log [\eta]=\log K+a \times \log M_v$$

A plot of log [η] versus log [$M_v$] (narrow standards) gives slope and the intercept K.

If K and a are known for both standards and samples, the molecular weights can be decided by mean of the relation to their respective constants.

GPC uses a Universal Calibration for quantitative evaluation of the molecular weight distribution.

The calibration is based on narrow standards to calculate a universal calibration curve. The retention time for each standard (the RI peak) is calculated. These values, together with the appurtenant molecular weight are used to make a universal calibration curve.

The software is able to produce a plot of Log Viscosity versus Log Molecular Weight for both the RI- and the viscosity-detector. Each detector produces a universal calibration for each fraction within the polymer chromatogram.

A universal calibration gives genuine molecular weight results.

The software can decide K and a for the standards.

The following values are recommended to be used.

PS: K=9.95*10$^{-5}$ a=0.725
PE: K=3.92*10$^{-4}$ a=0.725

The equipment used was a Waters 150CVplus Gel Permeation Chromatograph no. W-4412 (cf. Waters 150CVplus Viscometer Supplement) having a differential Refractive Index (dRI) detector and a single capillary viscometer detector, and three HT6E Styragel (porous styrenedivinylbenzene) columns from Waters. Calibration was made with narrow molecular weight distribution polystyrene standards with different molecular weights (a1116_05002). The mobile phase was 1,2,4-trichlorobenzene (purity 98.5%) with 0.25 g/l BHT, 2-tert-butyl-4-methylphenol added as an antioxidant. Millennium$^{32}$ Version 4 software from Waters was used for calculation of g' (LCB).

Viscosity Low Plots are determined for the polystyrene standards which have no long chain branching and therefore represent linear (unbranched) polymers, and for the branched polyethylene composition of the invention. The branching parameter is thereafter calculated from the equation:

$$g'=[\eta]_{branched}/[\eta]_{linear},$$

where $[\eta]_{branched}$ is the intrinsic viscosity of the branched polymer in question and $[\eta]_{linear}$ is the intrinsic viscosity of an linear (unbranched) standard polymer.

e) Shear Thinning Index

The shear thinning index $SHI_{(eta0.05/eta300)}$ was determined by dynamic rheology in a plate/plate rheometer.

This property can be measured as a ratio of the viscosity at two different shear stresses. In the present invention the shear stresses (or G*) at 0.05 kPa and 300 kPa are used for calculating the $SHI_{(eta0.05/eta300)}$ as a measure of the broadness of the molecular weight distribution.

$$SHI_{(eta0.05/eta300)}=eta_{0.05}/eta_{300}$$

wherein $eta_{0.05}$ is the complex viscosity at G*=0.05 kPa and
$eta_{300}$ is the complex viscosity at G*=300 kPa.

It was measured in a Physica MCR300 in oscillating—frequency sweep. Temperature was 170° C. and frequency range was 0.1-500 rad/s. Strain was set to 5%.

2. Compounding of Compositions

Flame retardant polymer compositions were produced by compounding together the components in a Busskneader, 200 mm.

The following compositions were prepared:

Composition 1:
  56 wt. % ethylene butylacrylate (BA) copolymer with BA content of 8.7 wt. %, MFR$_2$=0.45 g/10 min, M$_w$/M$_n$=50, g'=0.24, SHI$_{(eta0.05/eta300)}$=102.9;
  2 wt. % heterophasic propylene copolymer with 85 wt. % propylene homopolymer as matrix and 15 wt. % of ethylene propylene rubber, of which 7 wt. % are ethylene units, as dispersed phase, MFR$_2$=1.3 g/10 min, d=0.908 g/cm$^3$, tensile modulus=1300 MPa;
  12 wt % of silicone masterbatch with 40 wt % of polysiloxane;
  30 wt % chalk;
the composition had a d=1.153 g/cm$^3$ and a MFR$_2$ of 0.46 g/10 min (190° C., 2.16 kg).

Composition 2:
  58 wt. % ethylene butylacrylate (BA) copolymer with BA content of wt. %, MFR$_2$=0.45 g/10 min, M$_w$/M$_n$=50, g'=0.24, SHI$_{(eta0.05/eta300)}$=102.9;
  12 wt % of silicone masterbatch with 40 wt % of polysiloxane;
  30 wt % chalk;
the composition had a d=1.156 g/cm$^3$ and a MFR$_2$ of 0.41 g/10 min (190° C., 2.16 kg).

Composition 3 (Comparative):
  58 wt. % ethylene butylacrylate (BA) copolymer with BA content of 8.1 wt. %, MFR$_2$=0.45 g/10 min, M$_w$/M$_n$=17, g'=0.41, SHI$_{(eta0.05/eta300)}$=92.6;
  12 wt % of silicone masterbatch with 40 wt % of polysiloxane;
  30 wt % chalk;
the composition had a d=1.140 g/cm$^3$ and a MFR$_2$ of 0.39 g/10 min (190° C., 2.16 kg).

Composition 4:
  63.75 wt. % ethylene butylacrylate (BA) copolymer with BA content of 8 wt. %, MFR$_2$=0.45 g/10 min, M$_w$/M$_n$=50, g'=0.24, SHI$_{(eta0.05/eta300)}$=102.9;
  6.25 wt % of silicone masterbatch with 40 wt % of polysiloxane;
  30 wt % chalk;
the composition had a d=1.149 g/cm$^3$ and a MFR$_2$ of 0.51 g/10 min (190° C., 2.16 kg).

Cables were made on a laboratory extrusion line. The composition was extruded onto a 7 mm nylon rope and the insulation thickness was 1 mm. A tube-on die was used and the line speed was 25 and 50 meter per minute. The laboratory extrusion line was equipped with seven temperature zones (120, 140, 150, 160, 170, 170, 170° C.).

The following table 1 shows the ratio of surface (3D) to area (2D) which is a measure for the surface quality, i.e. he lower the ratio, the better is the surface quality. The surface areas have also been inspected visually and by touch. The values from ratio of surface (3D) to area (2D) is corresponding to visual and manual inspection.

TABLE 1

| Sample | MWD (M$_w$/M$_n$) of PE | g' of PE | Amount of polypropylene | ratio of surface (3D) to area (2D) |
|---|---|---|---|---|
| Composition 1 | 50 | 0.24 | 2 wt. % | 1.59 |
| Composition 2 | 50 | 0.24 | — | 1.63 |
| Composition 3 (Comparative) | 17 | 0.41 | — | 2.13 |
| Composition 4 | 50 | 0.24 | — | 1.49 |

A high ratio of surface (3D) to area (2D) means that the surface is rough. Thus, the surface of the inventive compositions is significantly better than the surface of the comparative example.

The invention claimed is:

1. A flame retardant polymer composition, comprising
  (A) a polyolefin comprising an ethylene homo- and/or copolymer with a molecular weight distribution M$_w$/M$_n$ of >20,
  (B) a silicone-group containing compound, and
  (C) an inorganic filler material,
  wherein the polyolefin (A) is produced by an autoclave reactor.

2. Flame retardant polymer composition according to claim 1 wherein the amount of component (A) is from 30 to 70 wt. % of the total polymer composition.

3. Flame retardant polymer composition according to claim 1, wherein component (A) comprises a polyolefin with a molecular weight distribution $M_w/M_n$ of >25.

4. Flame retardant polymer composition according to claim 1, wherein component (A) comprises a polyolefin with a g' value of 0.35 or less.

5. Flame retardant polymer composition according to claim 1, wherein component (A) comprises a polyolefin with a shear thinning index (SHI) $eta_{0.05}eta_{300}$ of at least 70.

6. Flame retardant polymer composition according to claim 1, wherein component (A) comprises a polyolefin with polar groups.

7. Flame retardant polymer composition according to claim 6 wherein the polyolefin with polar groups comprises a copolymer of alpha-olefin monomers with one or more co-monomers selected from $C_1$- to $C_6$-alkyl-acrylates, $C_1$- to $C_6$-alkyl-methacrylates, acrylic acid, methacrylic acid and vinyl acetate including ionomers thereof.

8. Flame retardant polymer composition according to claim 6 wherein the polyolefin with polar groups is present in an amount of at least 50 wt. % of the total weight of component (A).

9. Flame retardant polymer composition according to claim 1, wherein the amount of component (B) is from 1 to 20 wt. % of the total polymer composition.

10. Flame retardant polymer composition according to claim 1, wherein component (B) is a silicone fluid and/or gum, and/or a copolymer of ethylene and at least one other co-monomer which comprises a silicone group.

11. Flame retardant polymer composition according to claim 1, wherein component (B) comprises polydimethylsiloxane and/or a copolymer of ethylene and vinyl-polymethylsiloxane.

12. Flame retardant polymer composition according to claim 1, wherein the amount of inorganic filler (C) is from 20 to 60 wt. % of the total polymer composition.

13. Flame retardant polymer composition claim 1, wherein inorganic filler (C) is neither a hydroxide nor a hydrated compound.

14. Flame retardant polymer composition according to claim 1, wherein inorganic filler (C) comprises a carbonate, oxide and/or sulphate of an element of groups 1 to 13 of the Periodic System of the Elements.

15. Flame retardant polymer composition according claim 1, wherein component (C) comprises a metal carbonate.

16. Flame retardant polymer composition according to claim 1, wherein the composition further comprises
   (D) a polypropylene in an amount of 0.1 to 10 wt. % with respect to the total composition.

17. Flame retardant polymer composition according to claim 16, wherein component (D) has a MFR2 measured according to ISO 1133 at 230° C. and 2.16 kg of 0.1 to 15 g/10 min.

18. Flame retardant polymer composition according to claim 16, wherein component (D) comprises a propylene heterophasic copolymer comprising a polypropylene homo- or copolymer as matrix polymer and an incorporated ethylene-propylene-rubber.

19. Article comprising the flame retardant polymer composition according to claim 1.

20. Wire or cable comprising a layer made of the flame retardant composition according to claim 1.

21. Method for extruding a flame retardant layer of a wire or a cable using the flame retardant polymer composition according to claim 1, comprising a line speed of at least 20 m/min.

* * * * *